(12) United States Patent
Sae-Koe

(10) Patent No.: US 7,284,111 B1
(45) Date of Patent: Oct. 16, 2007

(54) INTEGRATED MULTIDIMENSIONAL SORTER

(75) Inventor: Katie Sae-Koe, San Jose, CA (US)

(73) Assignee: DinoChip, Inc., Rohnert Park, CA (US)

( * ) Notice: Subject to any disclaimer, the term of this patent is extended or adjusted under 35 U.S.C. 154(b) by 944 days.

(21) Appl. No.: 10/125,686

(22) Filed: Apr. 17, 2002

(51) Int. Cl.
*G06F 12/10* (2006.01)
*H04L 12/20* (2006.01)
*H04L 12/56* (2006.01)

(52) U.S. Cl. .................. 711/202; 370/254; 370/392
(58) Field of Classification Search ............. None
See application file for complete search history.

(56) References Cited

U.S. PATENT DOCUMENTS

| | | | |
|---|---|---|---|
| 5,327,557 A * | 7/1994 | Emmond | 707/3 |
| 5,636,210 A | 6/1997 | Agrawal | |
| 5,659,755 A | 8/1997 | Strohacker | |
| 6,064,674 A | 5/2000 | Doidge et al. | |
| 6,205,470 B1 | 3/2001 | Madden et al. | |
| 6,529,508 B1 * | 3/2003 | Li et al. | 370/392 |
| 6,553,002 B1 * | 4/2003 | Bremer et al. | 370/254 |
| 6,701,469 B1 * | 3/2004 | Matter et al. | 714/703 |

* cited by examiner

*Primary Examiner*—Gary Portka
*Assistant Examiner*—Duc T. Doan
(74) *Attorney, Agent, or Firm*—Aka Chan LLP

(57) ABSTRACT

A technique to implement an integrated multidimensional sorter (306) is to store data such that it may be retrieved in a sorted fashion. Entries are stored (407) into a memory according to time stamp value, and the time stamp value is divided (412) into multiple portions. The memory is organized as a pointer memory (505, 508, 513, and 520). An integrated multidimensional sorter may be implemented using integrated circuit technology using one or more integrated circuits (306). These integrated circuits may be used in management of network traffic, and provides quality of service (QoS) control.

30 Claims, 7 Drawing Sheets

Memory Map for IMDS, an example

| Head1 (for TS_1) Head2 (for TS_2) Head3 (for TS_3) | 505 |
| Body1 (for TS_1) Body2 (for TS_1) Body3 (for TS_1) | 508 |
| Free List1 (for TS_1) Free List2 (for TS_2) Free List3 (for TS_3) | 513 |
| FID List | 520 |

An example of search minimum Time Stamp

The Four Versions of Head and Body (3 bit TS Example)

Ver. 1

Combine Head and Body

Ver. 2

Separate Head and Body

PB: A pointer points to 1st location of Body

Pt_a, Pt_b: Pointer to next TS layer

Ver. 4

Separate Head and Body, has PB and PM in Head.

PB: A pointer points to 1st location of Body

PM: A pointer which values equals to 1st valid pointer in the Body.

Example: PM = Pt_a in the figure

Ver. 3

Separate Head and Body

PBmin: A pointer points to the location which has 1st valid pointer exists in the Body

INTEGRATED MULTIDIMENSIONAL SORTER

BACKGROUND OF THE INVENTION

The present invention relates generally to the field of computer and data networking, and more particularly, to techniques to more efficiently process the data packets of a network.

Computer networking is one of the most important technologies in the information age. Personal computers are on the desks of most business people and majority of homes in the United States, and also becoming more commonplace throughout the world. Computers are instrumental for facilitating electronic commerce and internet traffic. Computers are typically connected using a network that allows the sharing or transfer of data between computers and devices. This data may include computer files, e-mail, images, audio, video, real-time data, and other types of information. For example, when their computers are joined in a network, people can share files and peripheral such as modems, printers, tape backup drives, or CD-ROM drives. When networks at multiple locations are connected, people can send e-mail, share links to the global internet, or conduct videoconferences in real time with other remote users. Local area network (LANs) are used to connect computers within businesses and homes. The internet is typically used to connect individual computers and other networks, including local area networks.

Each computer has a set of predefined network ports, which act as mailboxes for incoming and outgoing messages. The ports are typically configured to support a particular network protocol, and hence to receive or send a type of packet that is compatible with the protocol. For example, one common port is the UDP (user datagram protocol) port, which provides a channel into the computer for datagram packets that are communicated using TCP/IP (transport control protocol/internet protocol). Datagram packets are sent to a specific UDP port by using a programming interface, such as "sockets." Sockets are a programming interface originated on Unix operating systems that allows network communication using a file I/O metaphor.

Despite the success of computer networks, there is continuing development to improve networking technology, especially since network traffic continues to rapidly grow. For example, it is desirable to increase transmission speed and network processing speed. This will allow more users to transfer greater amounts of data. Faster processing will allow better and faster filtering of network traffic so that, for example, selected users will receive better response times. Further, it is important to improve security on networks, which has increasingly become a high priority since the Sep. 11, 2001 terrorist attacks on the World Trade Center twin towers in New York City and the Pentagon in Washington, D.C. Better and faster network process will allow better filtering to prevent security breaches and transmission of computer viruses.

Integrated circuits are the building blocks of electronic devices and networks, including computers, personal digital assistants (PDAs), mobile and other telephony devices, digital cameras and video cameras, digital voice recorders, routers, switches, and network hubs. Some types of integrated circuit include microprocessors, memories, programmable logic devices (PLDs), and application specific integrated circuits (ASICs). As integrated circuit technology improves, it becomes possible to put more and more functionality on single integrated circuits.

As can be appreciated, there is a need for improvements in computer networking, especially for techniques to improve processing and speed of processing networking information.

SUMMARY OF THE INVENTION

The invention provides techniques to implement an integrated multidimensional sorter where data is stored such that it may be retrieved in a sorted fashion. Entries are stored into a memory according to time stamp value, and the time stamp value is divided into multiple portions. The memory is organized as a pointer memory. An integrated multidimensional sorter may be implemented using integrated circuit technology using one or more integrated circuits. The technique is efficient and allows processing (sorting) of a large amount of data, with minimal impact on throughput of the data through the system. These integrated circuits may be used in management of network traffic, and provides quality of service (QoS) control.

In an embodiment, the invention is an integrated circuit including M sorter blocks, where each sorter block has a user-selectable number of entries of one or more entries. Each entry has a time stamp value and a connection value, there are a total of N entries for all the M sorter blocks, and M is an integer 2 or greater. M may be user-selectable. When a first sorter block may be configured to have Y entries, there are M−1 remaining sorter blocks which have at most a total of (N−Y) entries. When a second sorter block is configured to have Z entries, the sorter blocks, not including the first and second sorter blocks, have at most (N−Y−Z) entries.

In operation, upon receiving a first packet of information on a first port, a first time stamp and a first connection value are stored in a first entry of a first sorter. Upon receiving a second packet of information on the first port, a second time stamp and a second connection value are a second entry of the first sorter. Upon receiving a third packet of information on a second port, a third time stamp and a third connection value are stored in a first entry of a second sorter. Upon receiving a fourth packet of information on the second port, a fourth time stamp and a fourth connection value are stored in a second entry of the second sorter.

In another embodiment, the invention is an integrated circuit including a first sorter block portion of the integrated circuit comprising N(1) entries, where each entry includes a connection value and a time stamp value. Entries in the first sorter block are sorted according to their time stamp value, and the number of entries N(1) is user-selectable.

A second sorter block portion of the integrated circuit includes N(2) entries, where each entry includes a connection value and a time stamp value. Entries in the second sorter block are sorted according to their time stamp value, and the number of entries N(2) is user selectable.

In another embodiment, the invention is an integrated circuit including first control circuitry to implement a first sorter block comprising N(1) entries, where each entry includes a connection value and a time stamp value. Entries in the first sorter block are sorted according to their time stamp value, and the number of entries N(1) is user-selectable. Second control circuitry to implement a second sorter block includes N(2) entries, where each entry comprises a connection value and a time stamp value. Entries in the second sorter block are sorted according to their time stamp value, and the number of entries N(2) is user-selectable.

In another embodiment, the invention is an integrated circuit including control circuitry to implement M sorter blocks, where each sorter block has a user-selectable number of entries of one or more entries. Each entry has a time stamp value and a connection value. There are a total of N entries for all the M sorter blocks, and M is an integer 2 or greater.

In another embodiment, the invention is a method of receiving a first entry to be stored in a memory location, where the first entry has a time stamp value and a data value. The time stamp value of the first entry is divided into two or more portions, a first time stamp portion and a second time stamp portion.

A first pointer memory structure is provided and referenced using a first pointer address and having a head and a body, where the head comprises a bit map field and a pointer-to-body field. A second pointer memory structure is provided and referenced using a second pointer address and having a head and a body, where the head comprises a bit map field and a pointer-to-body field. The second pointer address is stored at a location in the body of the first pointer memory structure based on the first time stamp portion. The location of the second pointer address is indicated in the bit map field of the head of the first pointer memory structure.

In another embodiment, the invention includes a method of receiving an entry having a binary time stamp having at least four bits and data value. The binary time stamp is divided into a first time stamp portion having at least two bits and second time stamp portion having at least two bits.

A first pointer memory structure is provided and referenced using a first pointer address and having a head and a body, where the head has a bit map field with four bits and the body has four memory positions. Each bit in the bit map field represents one of the four memory positions. The four bits of the head of the first pointer memory structure are initialized to a first state.

When storing a second pointer address in a first memory position of the four memory positions, a first bit of the four bits of the head of the first pointer memory structure is changed to a second state. When storing the second pointer address in a second memory position of the four memory positions, a second bit of the four bits of the head of the first pointer memory structure is changed to the second state. When storing the second pointer address in a third memory position of the four memory positions, a third bit of the four bits of the head of the first pointer memory structure is changed to the second state. When storing the second pointer address in a fourth memory position of the four memory positions, a fourth bit of the four bits of the head of the first pointer memory structure is changed to the second state.

Other objects, features, and advantages of the present invention will become apparent upon consideration of the following detailed description and the accompanying drawings, in which like reference designations represent like features throughout the figures.

BRIEF DESCRIPTION OF THE DRAWINGS

FIG. 6A shows the pointers before adding a time stamp. FIG. 6B shows the pointers after adding the time stamp.

DETAILED DESCRIPTION

Figure 1:
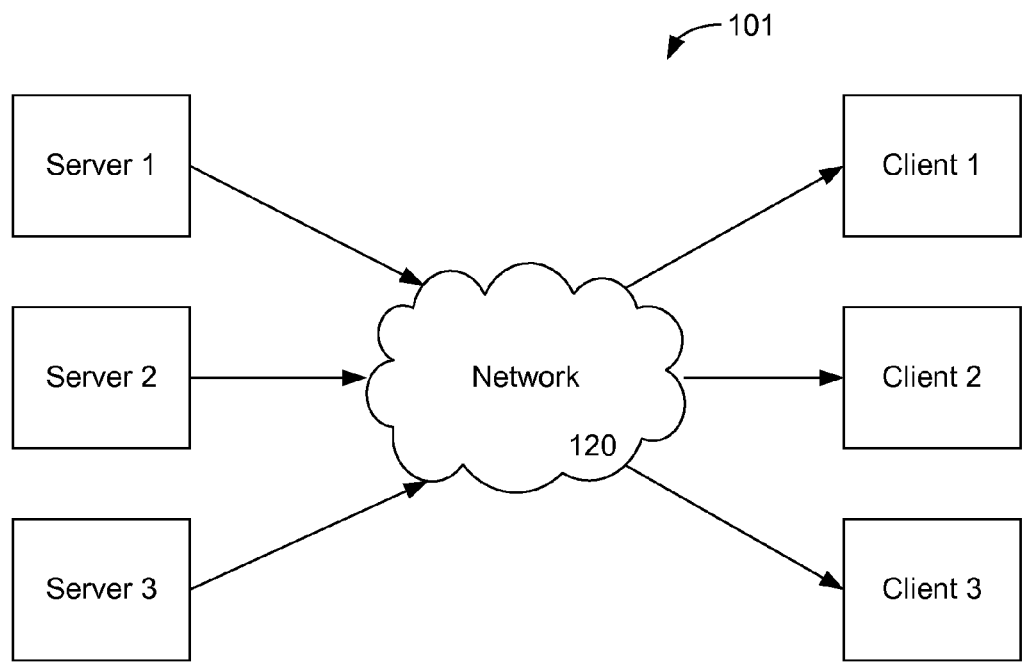
FIG. 1 shows a computer network system within which the present invention may be embodied.

FIG. 1 shows a computer network system 101 within which the present invention may be embodied. There may be any number of servers and clients in the system. For example, there may be thousand or even millions of servers and clients. In this system, there are three servers, server 1, server 2, and server 3, and there are three clients, client 1, client 2, and client 3. The servers communicate with the clients by exchanging packets over a network 120. The computer network system is representative of many different environments including a LAN system, a wide area network (WAN) system, and an internet system.

A network generally includes (1) at least two computers, (2) a network interface or network interface card (NIC) on each computer, (3) a connection medium, and (4) network operating system software. The NIC is a device that lets the computer talk to the network. The connection medium is usually a wire or cable, although wireless communication between networked computers and peripherals is also available. Some examples of network operating systems software include Microsoft Windows 95 or Windows NT, Novell NetWare, AppleShare, or Artisoft LANtastic.

Most networks include a hub or switch. Hubs, or repeaters, are simple devices that interconnect groups of users. Hubs forward any data packets—including e-mail, word-processing documents, spreadsheets, graphics, print requests-they receive over one port from one workstation to all their remaining ports. All users connected to a single hub or stack of connected hubs are in the same "segment," sharing the hub bandwidth or data-carrying capacity. As more users are added to a segment, they compete for a finite amount of bandwidth devoted to that segment.

Switches are smarter than hubs and offer more dedicated bandwidth to users or groups of users. A switch forwards data packets only to the appropriate port for the intended recipient, based on information in each packet header. To insulate the transmission from the other ports, the switch establishes a temporary connection between the source and destination, and then terminates the connection when the conversation is done.

A router links a local network to a remote network. On the internet, a router is a device or, in some cases, software in a computer, that determines the next network point to which a packet should be forwarded toward its destination. The router is connected to at least two networks and decides which way to send each information packet based on its current understanding of the state of the networks it is connected to. A router is located at any gateway (where one network meets another), including each Internet point-of-presence. A router is often included as part of a network switch.

A router may create or maintain a table of the available routes and their conditions and use this information along with distance and cost algorithms to determine the best route for a given packet. Typically, a packet may travel through a number of network points with routers before arriving at its destination. Routing is a function associated with the network layer (layer 3) in the standard model of network programming, the Open Systems Interconnection (OSI) model. A layer-3 switch is a switch that can perform routing functions.

Figure 2:
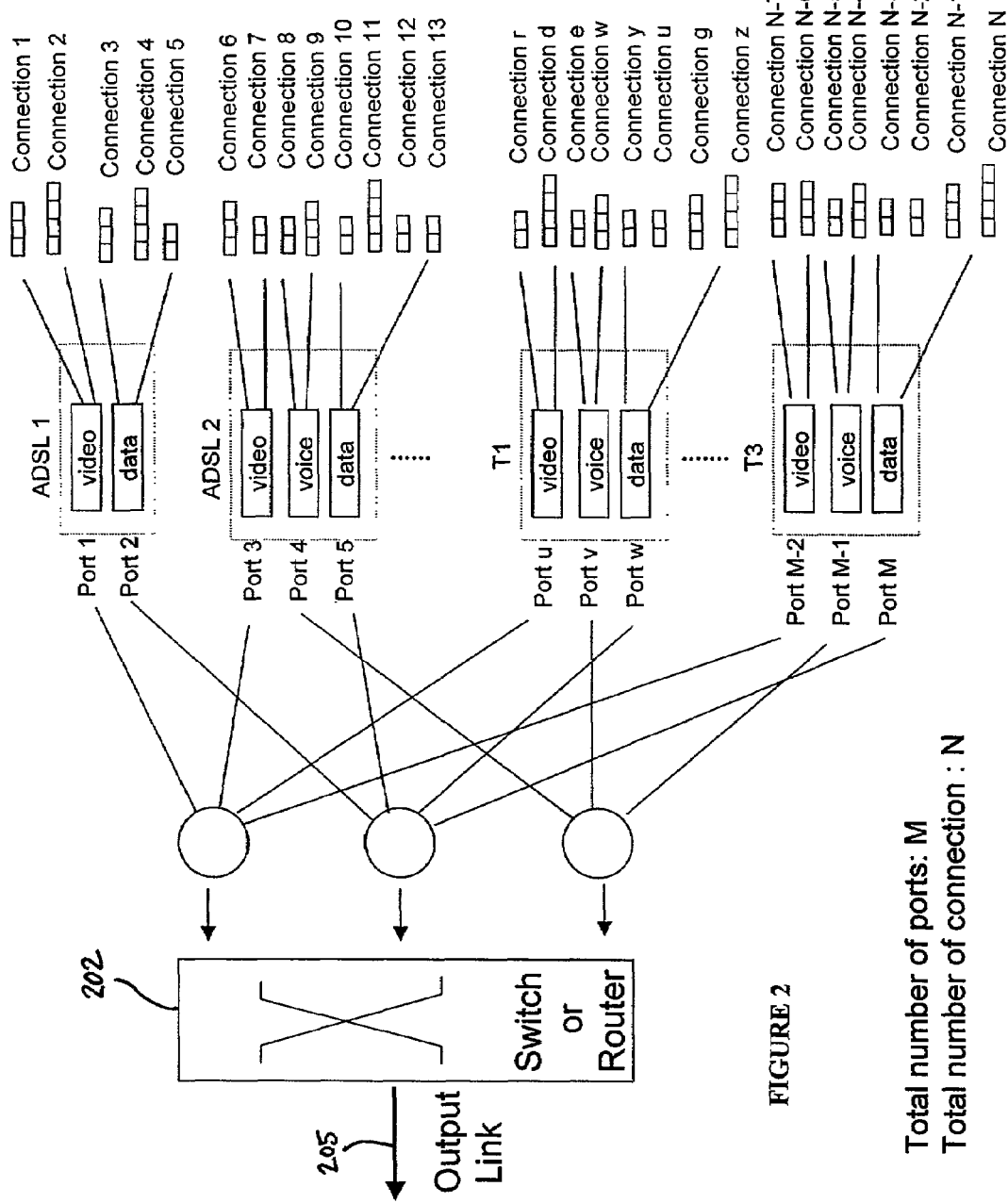
FIG. 2 shows a switch or router used to connect a number of ports and connections to a network.

FIG. 2 shows a switch or router 202 used to connect a number of ports and connections to a network, such as network 120, using an output link 205. ADSL, T1, and T3 are some examples of types of broadband connections. Each port may be allocated for a particular type of information such as video, voice, or data. There are M total ports (may also be referred to as a sorters in this document) and N total connections (may also be referred to as entries in this document). M and N are integers. The ports are numbered 1 through M, and the connections are numbered 1 through N. Each port has a number of connections associated with it. Specifically, port I has N(I) connections. So, port 1 has N(1) connections, which is two; port 2 has N(2) connections, which is 3; and port M has N(M) connections.

Each connection or entry stores the information of a packet. This connection data may be held in a memory such as a random access memory (RAM) or pointer memory data structure. This data includes the packet information and a time stamp of the packet. The time stamp gives the time that the packet was received. The packet information may also be referred to as packet data, connection value, or payload. In operation, many packets are received at a port at different times and these will be stored in entries. The packets in the entries will then be passed out of the port. There are various techniques to prioritize which entries are sent out first. Generally, the earlier received packets are sent out first. So, the packets with the lowest time stamp will be sent out first. The packet with the minimum time stamp has the highest priority. Other priority schemes may also be used. For example, in the alternative, the most recently received packets may be sent out first. In this case, the packets with the highest time stamp will be sent out first.

To implement such priority schemes, the entries for a particular port are sorted by time stamp to determine which time stamps will be sent out of the port first. To prioritize to send out earliest received entries first, the entries will be sorted so time stamps are from lowest to highest. Each port is sorted individually, which means the entries for port 1 will be sorted independently of port 2 and the other ports. And the entries in port 2 will be sorted independently of port 1 and the other ports. Therefore, each port may be referred to as a sorter because the entries associated with a particular sorted are sorted independently of the other sorters.

Some sorting techniques are binary tree and heap sort. Other sorting algorithms may also be used. Sorting the entries will typically take several memory cycles to complete.

In an implementation of the invention, the number of ports or connections, or both, are user-selectable. For example, a user may configure or program the device to have one port, two ports, three ports, or four ports or more. Furthermore, the user may also configure or program the device to have three connections in the first port, two connections for the second port, or any number of connections for a specific port that is permitted by the design. There are different techniques of designing a device to allow for user-configurability. For example, a user may configure the device by placing the appropriate signals at particular pins or by loading the appropriate bits into flip-flops, registers, storage, or memory cells of the device. Perhaps electrically erasable (EEPROM) or Flash memory cells may be used to allow for nonvolatile storage of the user's configuration. Or static RAM (SRAM) or dynamic RAM (DRAM) cells may be used to allow for volatile storage of the user's configuration.

There may be any number of connections, which may be user selectable, assigned to each port. For example, port 1 of FIG. 2 is for ADSL 1 video and has two connections, connection 1 and 2. Port w is for T1 data and has four connections, connections y, u, g, and z. In an implementation, the total number of connections N may be divided in any desired way among the ports. For example, if N is 64 K and there are two ports, if port 1 has 25 connections, then port 2 may have at most 64 K-25 connections.

Generally, the number of ports a user selects will depend on the number of devices a user will be using. The number of connections will generally be allocated according to bandwidth, where the greater bandwidth ports will have more connections. For example, a T1 video connection has greater bandwidth than an ADSL voice connection, and therefore will usually have a greater number of connections. As can be appreciated, as N and M increase, the circuitry to implement the sorters and entries becomes more complicated.

Alternatively, in another implementation of the invention, rather than user-selectability, a device may be designed with fixed number of ports and connections, and the user may choose to not use all the available ports and connections. In another implementation, the features such as the number of ports and connections of the device may be configured by selecting the appropriate masks during fabrication. This may be referred to as factory programmability.

Figure 3:
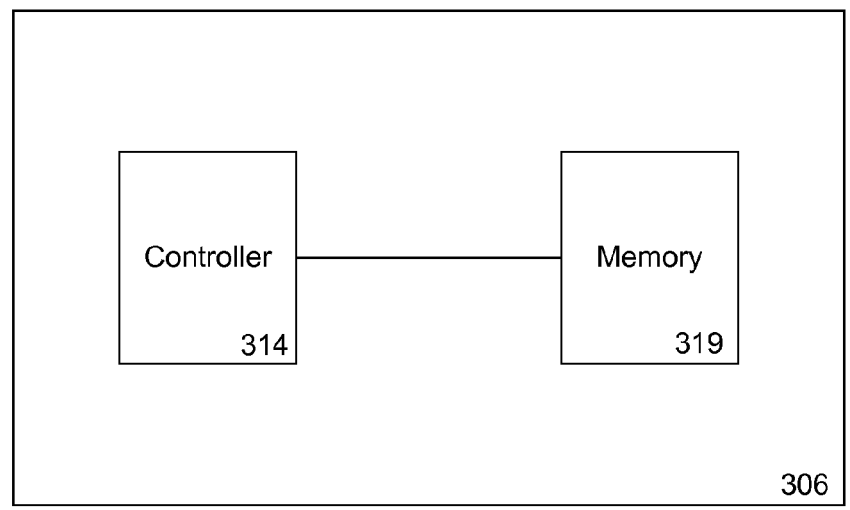
FIG. 3 shows an integrated circuit or chip with a controller or control circuitry portion and memory portion.

The ports (sorters) and connections (entries) may be implemented using one or more integrated circuits. In one embodiment, the sorters and entries are implemented using a single integrated circuit. FIG. 3 shows an integrated circuit or chip 306 with a controller or control circuitry portion 314 and memory portion 319. The control circuitry is connected to the memory. The control circuitry implements the sorters and entries while the memory provides the storage for the entries. For example, the control circuitry would implement the user-selectability feature of the number of sorters and entries. In an embodiment of the invention, M is at least two, so there are two or more sorters on a single integrated circuit. The invention may be referred to as an integrated multiple dimension sorter (IMDS). The integrated circuit be a PLD or field programmable gate array (FPGA) or ASIC, or a custom-designed integrated circuit.

In an alternative implementation, the controller 314 and memory 319 are on separate integrated circuits. Integrated circuits 314 and 319 could be connected using traces of a PC board or may be a wire or cable. The integrated circuits may be on different electronic boards or even in different locations, being connected by a network or modem. The memory may be, for example, a static RAM (SRAM) or dynamic RAM (DRAM) integrated circuit, a memory integrated with a combination of memory technologies. The memory may also be a fixed disk or other magnetic storage, or electrically erasable (EEPROM) storage. However, disk drive technology has generally slower access times than integrated circuit memories and therefore would not be used in a higher performance implementation.

Figures 4, 5:
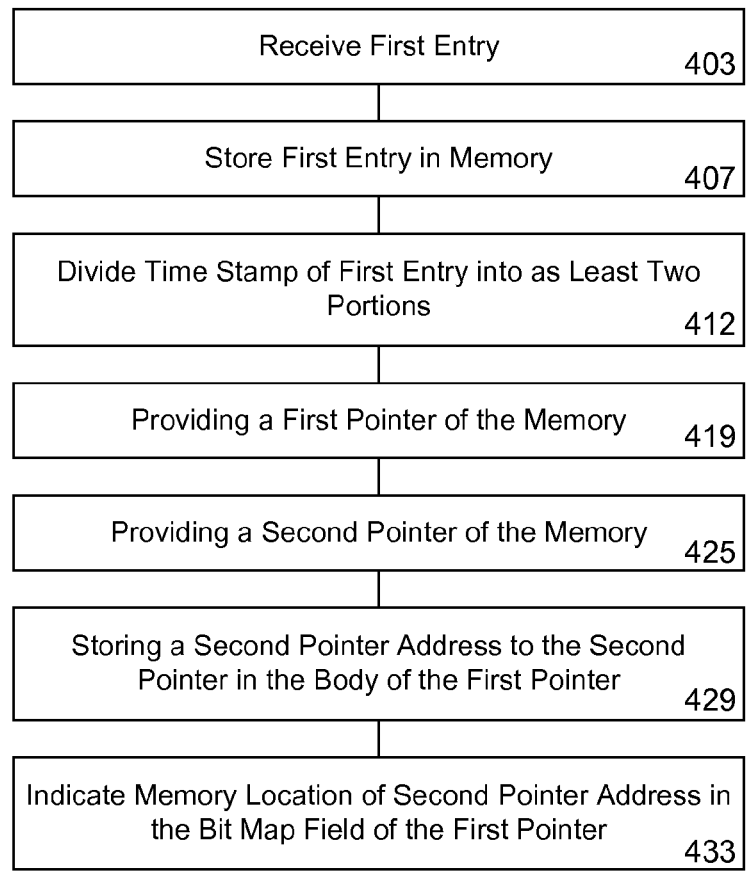
FIG. 4 shows a flow diagram of a technique of the invention.
FIG. 5 shows an example of a memory map for a pointer memory.

FIG. 4 shows a flow diagram of a technique of the invention. The controller circuitry portion of the integrated circuit typically is used to implement this technique. The controller circuitry may include logic gates, state machines, registers, flip-flops, and others circuit used to implement logic.

In a step 403, the technique includes receiving a first entry to be stored in a memory location. The first entry has a time stamp value and a connection or data value, and may includes other information. The information of the entry may sometimes be referred to as the payload. In a specific embodiment, this entry is a packet received over the network, and the time stamp is the time which the packet was received. As discussed above, the memory location may be on the same integrated circuit as the controller or a different integrated circuit.

In a step 407, the first entry will be stored in a position or location in the memory which is based upon its time stamp value. Any subsequent entries, such as second and third entries, will also be stored in positions or locations in the memory based upon their time stamp values. In an embodiment, the time stamp value is represented as a binary value. However, other implementations, the time stamp value may be represented in another numbering systems such as octal, decimal, or hexadecimal. Depending on the specific application, the time stamp may be any length. For example, the time stamp may be 4 bits, 6 bits, 8 bits, 16 bits, 24 bits, or 32 bits or more.

In a step 412, when storing an entry into the memory, the time stamp is divided into at least two portions or parts. For example, a 6-bit time stamp value may be divided into two 3-bit portions. A 7-bit time stamp value may be divided into a 3-bit portion and a 4-bit portion. A 17-bit time stamp value may be divided into a one five 3-bit portions and one 2-bit portion. How the time stamp is divided into portions depends on the length of the time stamp, organization of the memory, speed of the network in transferring packets, and other factors. In general, it is desirable to optimize the speed at which packets are stored.

In a specific embodiment, the first entry is stored in the memory that is organized as a pointer memory. A pointer is a reference to another memory location. In particular, the pointer stores the address of another memory location. In a step 419, there will be a first pointer memory structure. This first pointer memory structure will be referenced using a first pointer address and will have a head and a body. The head will have a bit map field and a pointer-to-body field.

In a specific embodiment, the bit map field will have a single binary bit for each memory location in its body. In other embodiments, the bit map field may be represented in another format, such as octal or hexadecimal digits. Therefore, there will be n binary bits for a body having n memory locations. For example, if there are eight locations in the body, the bit map field will have eight bits. And the bit map field is used to uniquely identify one of the memory locations of the body. For example, the most significant bit (MSB) of the bit map field may be used to indicate a value is being stored in a first memory location body. The least significant bit (LSB) of the bit map field may be used to indicate a value is being stored in a last memory location (i.e., location n) of the body. If the MSB is bit 0, then bit 1 may be used to indicate a value is being stored in a second location. Other techniques for uniquely representing or identifying memory locations using a bit map field may be used. For example, the LSB may be used to indicate the first memory location, and the MSB used to indicate the last memory location.

Generally, the number of bits in the bit map field will be related to how the time stamp is divided. Specifically, if the time stamp portion has n bits, then the bit map field to store that time stamp portion will have 2^n bits and there will also be 2^n memory locations for the pointer structure. For example, if the time stamp field has a 3-bit portion, then the bit map field will have 2^3 or 8 bits.

FIG. 5 shows an example of how the memory is organized (i.e., memory map) to make a pointer memory. This memory can be SRAM, SDRAM, or even DRAM. An integrated multidimensional sorter may be implemented using any kind of memory technology. There is a section 505 of the memory allocated for heads of the pointers, a section 508 for bodies of the pointers, a section 513 for free list, and a section 520 for a connection value or flow ID (FID) list. In this figure, three different pointer heads are represented by head1, head2, and head3. Three different pointers to bodies are represented by body1, body2, and body3. Three different free lists are represented by free list1, free list2, and free list3. There is one connection value or FID list; however, in other embodiments, there may be a two or more connection value or FID lists (flow ID list).

Returning to FIG. 4, in a step 425, a second pointer memory structure is provided. The second pointer memory structure is similar to that discussed above for the first pointer memory structure. However the bit map field for the second pointer memory structure may or may not have the same number of the bits as the first pointer memory structure. The reason is similar to that discussed above for how the time stamp field may be divided into portions have any number of bits. The second pointer memory structure is referenced using a second pointer address and has a head and a body. The head has a bit map field and a pointer-to-body field. As indicated by a step 429, the second pointer address is stored at a location in the body of the first pointer memory structure based on the first time stamp portion.

In step 433, as was discussed above, the location of the second pointer address is indicated in the bit map field of the head of the first pointer memory structure.

The steps above are for storing a single portion of a time stamp into memory. The technique may be extended to have as many steps (similar to steps 419 to 433 repeated) and pointers as needed to store an entry into the memory. So, to store a second portion of the time stamp into memory, there would be an additional step of storing a third pointer address at a location in the body of the second pointer memory structure based on the second time stamp portion. And, there would be a step to store at a memory location referenced by the third pointer address the data value.

The technique of FIG. 4 merely illustrates the flow of one particular implementation of the invention. As one of skill in the art will recognize, there are many possible variations and alternatives of the approach described in above, and any of these variations may be used.

After entries are stored using the above flow, they may be easily retrieved in out of the memory according to a sorted order. For example, the entries may be retrieved by minimum or lowest time stamp or maximum or greatest time stamp. A more detailed example of retrieving an entry with a specific time entry stamp is discussed below.

This invention provides a technique of searching or sorting information. Assume for some application, we need to have M sorters to sort N entries' values, which we can call "time stamp" or "TS". For example, sorter 1 can sort N_1 time stamps, sorter 2 can sort N_2 time stamps, sorter 3 can sort N_3 time stamps, and so forth. Therefore, sorter M can sort N_M time stamps. N_1+N_2+N_3+ . . . +N_M=N. However, each sorter can also sort up to N time stamps. For example, N_N while N_2=N_3= . . . N_M=0.

As the example shown above, the goal of this invention is to build an integrated sorter in one single data structure. The requirements are as follows. (1) M sorters, which can call "ports." (2) Each port can sort (or search the minimum or maximum TS) up to N time stamps. (3) Each sorter's TS cannot be mixed with other sorter's TS.

For single sorter, people use binary tree or heap algorithms to sort. For example, to sort 256 time stamps, if using radix=2 (where each binary tree node compares 2 TS), it takes 8 comparisons (since $2^8=256$) to find the minimum or maximum TS. If using radix=4 (where each binary tree node compares 4 TS), it takes 4 comparisons (since $4^4=256$) to find the minimum or maximum TS.

For a multiple dimensional sorter, there are no good exisiting solutions. A straightforward approach is to duplicate the approaches used for a single sorter, Existing solutions are not good enough. As explained above, no existing sorting schemes can be implemented in an efficient way, the main drawbacks are as follows. They require expensive hardware (e.g., many comparators). The design cannot be scaled up because there is a need to duplicate from single sorter to become multiple sorters. There needs to be at least O(logN) operations to find the minimum or maximum TS, where N is the number of TS needs to be sort.

This application provides a brief description of the invention and includes a discussion of how it accomplishes what it does. This application has examples and drawings. This novel sorting scheme is based on follows concepts: (1) Break each time stamp to pieces:

Each piece represents several bits of time stamp. For example, a given w bits wide time stamp can be chopped into v pieces, TS (w)=TS_1(w_1) & TS_2(w_2) & . . . & TS_v(w_v), where & means concatenate.

TS_1 has w_1 bits. Its first bit is the most significant bit (MSB) of the whole time stamp (or the LSB if so desired). TS_2 has w_2 bits, and so on. Note that w_1+w_2+ . . . +w_v=w. The values of each w_x can be any value, as long as the sum of all w_x(x@[1 . . . v]) is w.

Each TS layer composes of head and body. The head has two parts, bit map and pointer_to_body (PB). The bit map has $2^{w\_x}$ bits (x is the layer number). Each bit represents the status of the corresponding pointer in the body. For example, if bit 12 is asserted, then pointer 12 in the body is a valid pointer. Note that the bit map can also be decoded or compressed, but this may require more logic to handle the decoding or compression. For an integrated circuit embodiment, this would add additional circuitry and would increase the die size, which is generally undesirable.

The PB can be used as memory pointer to the body of that TS layer (if the two are separate). The body contains the pointers to the next TS layer. Note that the head and body can be combined to one block or separated (e.g., two or more different memory locations). Each TS's pieces will be decoded and then populated in its corresponding TS layer.

Figure 6:
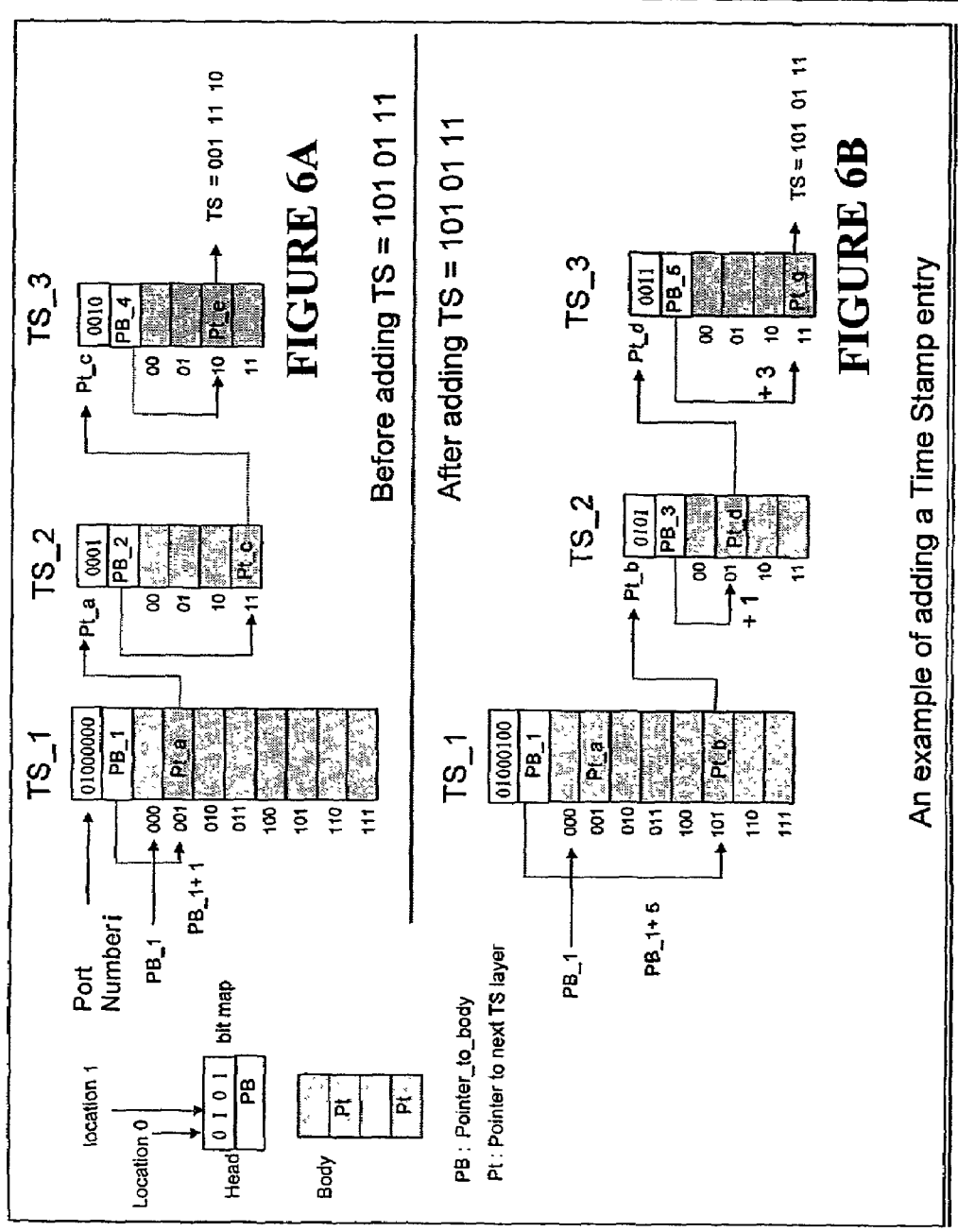
FIGS. 6A and 6B show a more detailed example of a technique of adding a time entry stamp.

FIGS. 6A and 6B show a more detailed example of a technique of adding a time entry stamp. FIGS. 6A and 6B show an example of a 7-bit TS, TS="1010111." FIG. 6A shows the pointers before adding this time stamp. FIG. 6B shows the pointers after adding this time stamp.

Lets choose w_=3, w_2=2, W_3=2. Therefore, TS_1 is 3 bits, and equal to "101." TS_2 is 2 bits, and equal to "01." TS_3 is 2 bits, and equal to "11." TS_3 's bit map is 8 bits ($2^3=8$), and contains 8 pointers in body, while TS_2 and TS_3's bit map is 4 bits ($2^2=4$), and contains $2^2=4$ pointers in body.

FIGS. 6A and 6B show an example of adding a TS entry. The operations are as follows.

Operations on the first layer (TS_1): Use the port number i as a pointer to find the bit map and PB (pointer_to_body) in the head of first TS layer. Decode "101" as 5.

Case A: If bit_5 location in the bit map is 1, that means there is another TS entry with the same TS_1 value, i.e., TS_1="101." Use PB+5 as the address to read out pointer in body. This is the pointer to next TS layer.

Case B: If bit_5 location in the bit map is 0, that means no other TS entry has the same TS_1 value. In this case, we need to add TS to the sorter starting from the current layer. We need to get a pointer (e.g., pt b in FIG. 6B) from free list (see memory map of FIG. 5), and use PB+5 as the address to store it in body, this is the pointer to next TS layer. Finally we need to set the bit_5 location in the bit map to 1 to indicate there is a corresponding TS entry whose TS_1 is "101."

Operations on the second layer (TS_2): Use the pt_b as address to find the bit map and PB (pointer_to_body) in the head of second TS layer. Decode "01" as 1.

Case A: If bit_1 location in the bit map is 1, that means there is another TS entry with the same TS_2 value, i.e., TS_2="01." Use PB+1 as the address to read out pointer in body. This is the pointer to next TS layer.

Case B: If bit_1 location in the bit map is 0, that means no other TS entry has the same TS_2 value. In this case we need to add TS to the sorter, starting from the current layer. We need to get a pointer (e.g., pt_d in FIG. 6B) from free list, and use PB+1 as the address to store it in body, this is the pointer to next TS layer. Finally we need to set the bit_1 location in the bit map to 1, to indicate there is a corresponding TS entry whose TS_2 is "01."

Use the port number i as a pointer to find the bit map and PB (pointer to body) in the head of first TS layer. Decode "11" as 3.

Case A: If bit_3 location in the bit map is 1, that means there is another TS_3 entry with the same TS_3 value, i.e., TS_3="11." Use PB+3 as the address to read out pointer in body. This is the pointer to next TS layer.

Case B: If bit_3 location in the bit map is 0, that means no other TS entry has the same first TS_3 value. We need to get a pointer (e.g., pt_g in FIG. 6B) from free list, and use PB+3 as the address to store it in body, this is the pointer to next TS layer. Finally we need to set the bit_3 location in the bit map to 1, to indicate there is a corresponding TS entry whose TS_1 is "11." The adding procedure is now completed.

Returning to FIG. 5, specifically, there are 3 TS pieces, TS_1, TS_2, and TS_3. Each piece has Head and Body. Besides, we have individual Free List to maintain the pointer (if the bit map of Head in that TS piece is 0, we will get a pointer from Free List, and store it back to the body using (PB (pointer to body)+bit_location as address)). Finally, we have FID list (Flow ID list) to maintain connection (or Flow ID) Link List. Different connections with same TS will associated by the link list.

Figure 7:
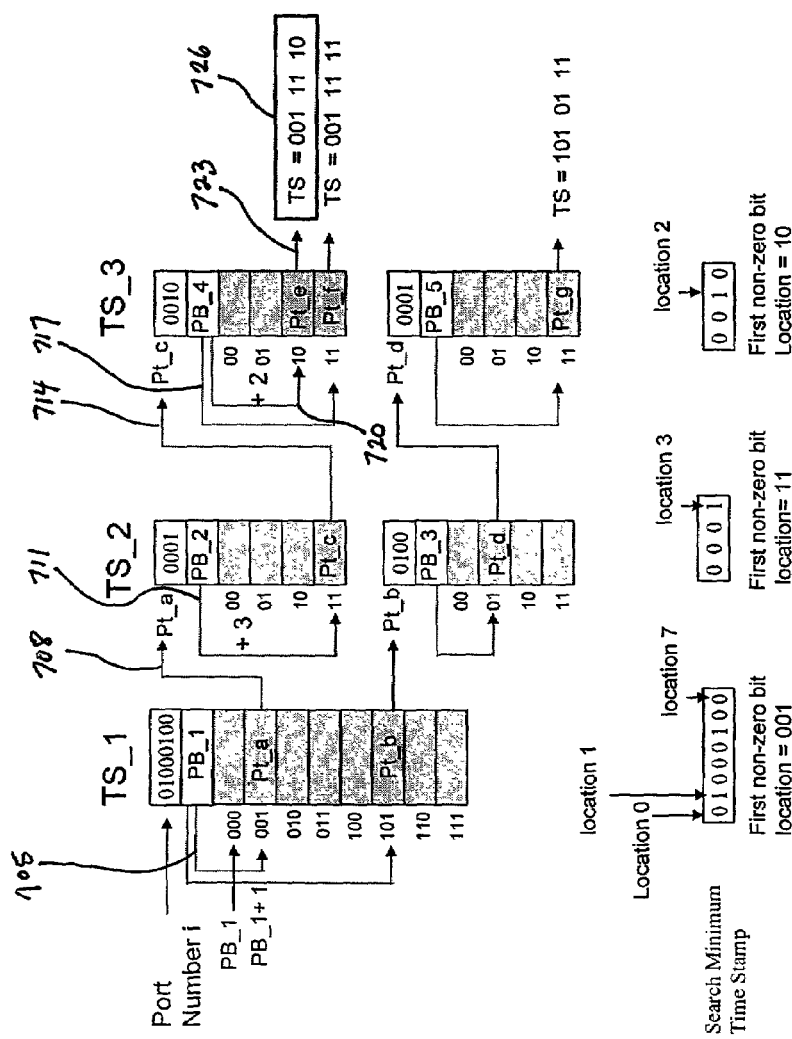
FIG. 7 shows a more detailed example of searching for a minimum time entry stamp.

FIG. 7 shows a more detailed example of searching for a minimum time entry stamp. The data flow is indicated by arrows 705, 708, 711, 714, 717, 710, and 723. The result is shown by box 726. Although this example shows searching for a minimum time stamp, a maximum time stamp may be searched for using a similar technique. More specifically, instead of starting with the MSB, start at the LSB first.

When searching minimum TS, the operations are as follows. Use the port number i as a pointer to find the bit map and PB (pointer_to_body) in the head of first TS layer. Find the first_non-zero_bit_location. Use PB+first_non-zero_bit_location as the address to read out pointer in body.

This is the pointer to next TS layer. In the example, the first_non-zero_bit_location is "001," and the corresponding pointer is pt_a.

Use the pt_a as address to find the bit map and PB (pointer_to_body) in the head of second TS layer. Find the first_non-zero_bit_location. Use PB+first_non-zero_bit_location as the address to read out pointer in body. This is the pointer to next TS layer. In the example, the first_non-zero_bit_location is "11," and the corresponding pointer is pt_c.

Use the pt_c as address to find the bit map and PB (pointer to body) in the head of third TS layer. Find the first_non-zero_bit_location. Use PB+first_non-zero_bit_location as the address to read out pointer in body. This is the pointer to next TS layer. In the example, the first_non-zero_bit_location is "10," and the corresponding pointer is pt_e.

As a result of these operations, the minimum TS can be found based on "001" & "11" & "10" or "0011110," where & represents concatenation.

FIGS. 8A, 8B, 8C, and 8D show four different versions of pointer structures which may be used to implement the invention. Depending on the particular implementation or application, each version has some special benefits. As described above, a time stamp (TS) pieces has two parts, head and body. These can be combined to have one part or separate parts. To illustrate this concept clearly, FIGS. 8A, 8B, 8C, and 8D show that there is total four versions of head and body structure that may be implemented.

Figure 8A:
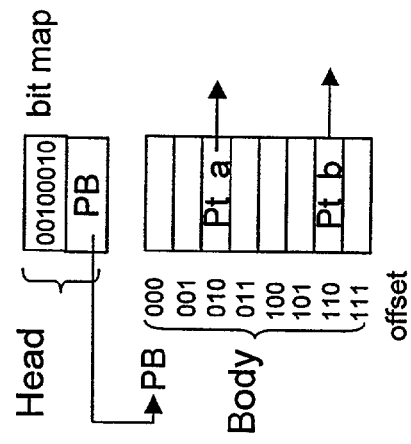
FIGS. 8A, 8B, 8C, and 8D show four different versions of pointer structures.

FIG. 8A shows version 1. The head and body are combined into one part, so there is no no need for a pointer to point to the body location.

Figure 8B:
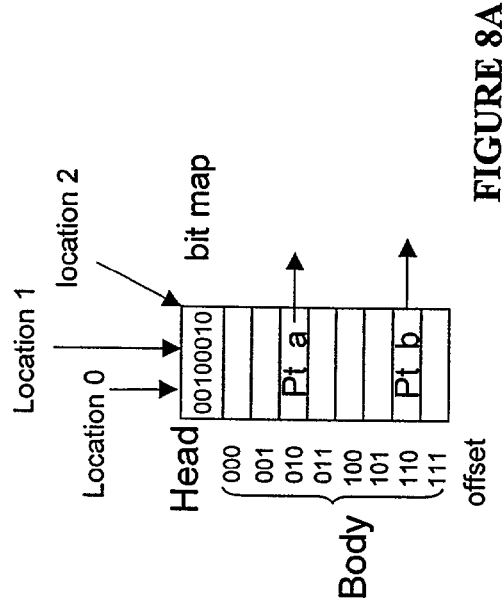

FIG. 8B shows version 2. This version has separate head and body. A pointer (PB) to point to the body location is needed.

Figure 8D:
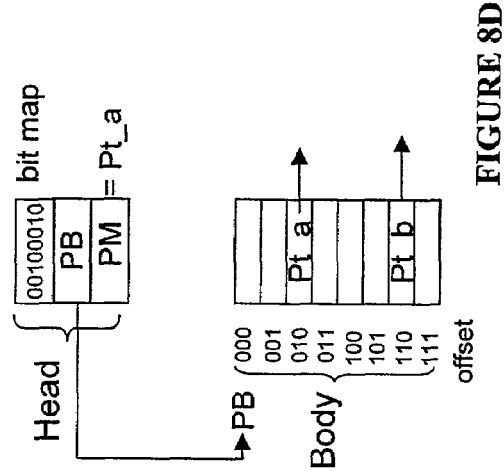
Figure 8C:
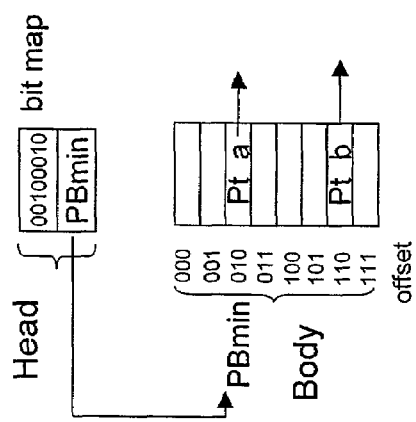

FIG. 8C shows version 3. This version also has separate head and body. There is a special pointer called PBmin which points to the location which has first valid pointer existing in the body.

FIG. 8D shows version 4. This version also has separate head and body. There are two pointers in the head, PB and PM. The PB pointer points to first location of the body. The PM pointer which value equals to first valid pointer in the body. For example, in FIG. 8D, PM=Pt_a.

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications. This description will enable others skilled in the art to best utilize and practice the invention in various embodiments and with various modifications as are suited to a particular use. The scope of the invention is defined by the following claims.

What is claimed is:

1. A method comprising:
   receiving a first entry to be stored in a memory location, wherein the first entry has a time stamp value and a data value;
   dividing the time stamp value of the first entry into two or more portions, a first time stamp portion and a second time stamp portion;
   providing a first pointer memory structure, referred to by a first pointer address, having a head and a body, wherein the head comprises a bit map field and a pointer-to-body field;
   providing a second pointer memory structure having a head and a body, wherein the head comprises a bit map field and a pointer-to-body field;
   storing a second pointer address in a first position in the body of the first pointer memory structure based on the first time stamp portion; and
   indicating the first position in the head of the first pointer, wherein an address stored in the pointer-to-body field added to a value in the bit map field of the first pointer will reference the first position, and the second pointer address points to the second pointer memory structure.

2. The method of claim 1 further comprising:
   storing a third pointer address at a location in the body of the second pointer memory structure based on the second time stamp portion.

3. The method of claim 2 further comprising:
   storing at a memory location referenced by the third pointer address the data value.

4. The method of claim 1 wherein the first position is indicated in the bit map field of the head of the first pointer.

5. The method of claim 1 wherein two or more pointer addresses are stored in the body of the first pointer structure, and the positions in the body of each of these two or more pointer addresses are indicated in the head of the first pointer.

6. The method of claim 1 further comprising:
   storing a third pointer address in a second position in the body of the first pointer memory structure based on the first time stamp portion; and
   indicating the second position in the head of the first pointer, wherein the second pointer address points to another pointer memory structure, different from the second pointer memory structure.

7. The method of claim 6 further comprising:
   storing a fourth pointer address in a third position in the body of the first pointer memory structure based on the first time stamp portion; and
   indicating the third position in the head of the first pointer, wherein the second pointer address points to another pointer memory structure, different from the second and third pointer memory structures.

8. The method of claim 1 wherein the pointer-to-body field of the first pointer memory structure comprises a pointer address to the body of the first pointer memory structure.

9. The method of claim 1 wherein the body of the first pointer memory structure comprises at least two positions, each to store a pointer address.

10. The method of claim 1 wherein the body of the first pointer memory structure comprises at least four positions, each to store a pointer address.

11. The method of claim 1 wherein for the first pointer memory structure, a number of bits n in the bit map field is less than or equal to a maximum number of positions in the body, and n is at least 2.

12. The method of claim 1 wherein the indicating the first position in the head of the first pointer occurs after the storing a second pointer address in a first position in the body of the first pointer memory structure.

13. The method of claim 1 wherein each position in the body of the first pointer memory structure is assigned a unique binary value, the body of the first pointer memory structure has two or more positions, and the first position is assigned a unique binary value that matches bits of the first time stamp portion.

14. The method of claim 1 wherein the first time stamp portion has i bits and the body of the first pointer memory structure has at least $2^i$ positions.

15. The method of claim 14 wherein second time stamp portion has j bits, j is less than i, and the second pointer memory structure has at least $2^j$ positions, but less than $2^i$ positions.

16. The method of claim 14 wherein the bit map field of the first pointer structure has $2^i$ bits.

17. The method of claim 14 wherein the bit map field of the first pointer structure has $2^i$ or fewer bits.

18. The method of claim 1 wherein each successive position in the body of the first pointer memory structure is assigned a successive binary value.

19. The method of claim 1 wherein each bit of the first time stamp portion of the time stamp value is a more significant bit than each bit of the second time stamp portion.

20. A method comprising:
receiving an entry comprising a binary time stamp having at least four bits and a data value;
dividing the binary time stamp into a first time stamp portion having at least two bits and second time stamp portion having at least two bits;
providing a first pointer memory structure, referenced using a first pointer address and having a head and a body, wherein the head comprises a bit map field comprising four bits and the body comprises four memory positions, each bit in the bit map field representing one of the four memory positions;
initializing the four bits of the head of the first pointer memory structure to a first state;
when storing a second pointer address in a first memory position of the four memory positions, changing a first bit of the four bits of the head of the first pointer memory structure to a second state;
when storing the second pointer address in a second memory position of the four memory positions, changing a second bit of the four bits of the head of the first pointer memory structure to the second state;
when storing the second pointer address in a third memory position of the four memory positions, changing a third bit of the four bits of the head of the first pointer memory structure to the second state; and
when storing the second pointer address in a fourth memory position of the four memory positions, changing a fourth bit of the four bits of the head of the first pointer memory structure to the second state,
wherein an address stored in a pointer-to-body field in the first point memory structure added to a value in the bit map field will reference a memory position where the second pointer address is stored.

21. The method of claim 20 further comprising:
storing the second pointer address in the first, second, third, or fourth memory position based on the first time stamp portion.

22. The method of claim 21 wherein when the first time stamp portion is 00, store in the first memory position,
when the first time stamp portion is "01," store in the second memory position,
when the first time stamp portion is "10," store in the third memory position, and
when the first time stamp portion is "11," store in the fourth memory position.

23. The method of claim 21 wherein the second pointer address points to a second pointer memory structure, having a head and a body, wherein the head comprises a bit map field comprising four bits and the body comprises four memory positions, each bit in the bit map field representing one of the four memory positions, and the method further comprises:
when storing a third pointer address in a first memory position of the four memory positions of the second pointer memory structure, changing a first bit of the four bits of the head of the second pointer memory structure to a second state;
when storing the third pointer address in a second memory position of the four memory positions of the second pointer memory structure, changing a second bit of the four bits of the head of the first pointer memory structure to the second state;
when storing the third pointer address in a third memory position of the four memory positions of the second pointer memory structure, changing a third bit of the four bits of the head of the first pointer memory structure to the second state; and
when storing the third pointer address in a fourth memory position of the four memory positions of the second pointer memory structure, changing a fourth bit of the four bits of the head of the first pointer memory structure to the second state.

24. The method of claim 23 further comprising:
storing the data value at a memory location referenced by the third pointer address.

25. The method of claim 20 further comprising:
checking each bit in the bit map field of the first pointer memory structure in sequence from a most significant bit to a least significant bit until a first output bit is found to be in the second state; and
retrieving a second pointer address value associated with the first output bit.

26. The method of claim 25 wherein the stored data value associated with the first output bit has a minimum binary time stamp value.

27. The method of claim 25 wherein the stored data value associated with the first output bit has a maximum binary time stamp value.

28. The method of claim 20 further comprising:
checking each bit in the bit map field of the first pointer memory structure in sequence from a least significant bit to a most significant bit until a first output bit is found to be in the second state; and
retrieving a stored data value associated with the first output bit.

29. The method of claim 28 wherein the stored data value associated with the first output bit has a minimum binary time stamp value.

30. The method of claim 28 wherein the stored data value associated with the first output bit has a maximum binary time stamp value.

* * * * *